US012647337B2

(12) United States Patent
Filsfils et al.

(10) Patent No.: US 12,647,337 B2

(45) Date of Patent: Jun. 2, 2026

(54) PERFORMANCE MEASUREMENT ANALYTICS PLATFORM BASED ON TOPOLOGY STABILITY

(71) Applicant: Cisco Technology, Inc., San Jose, CA (US)

(72) Inventors: Clarence Filsfils, Brussels (BE); Pablo Camarillo Garvía, Madrid (ES); Rakesh Gandhi, Stittsville (CA); Ahmed Mohamed Ahmed Abdelsalam, L'Aquila (IT); Sonia Ben Ayed, Vanves (FR)

(73) Assignee: Cisco Technology, Inc., San Jose, CA (US)

(*) Notice: Subject to any disclaimer, the term of this patent is extended or adjusted under 35 U.S.C. 154(b) by 197 days.

(21) Appl. No.: 18/372,782

(22) Filed: Sep. 26, 2023

(65) Prior Publication Data

US 2025/0106133 A1 Mar. 27, 2025

(51) Int. Cl.
H04L 43/08 (2022.01)
H04L 41/12 (2022.01)

(52) U.S. Cl.
CPC .............. H04L 43/08 (2013.01); H04L 41/12 (2013.01)

(58) Field of Classification Search
None
See application file for complete search history.

(56) References Cited

U.S. PATENT DOCUMENTS

| | | | |
|---|---|---|---|
| 7,886,034 B1* | 2/2011 | Hartmann | .......... H04L 67/1076 711/100 |
| 8,374,092 B2 | 2/2013 | Previdi et al. | |
| 8,675,517 B2 | 3/2014 | Swan | |
| 10,484,253 B2 | 11/2019 | Arsenie et al. | |
| 10,523,517 B2 | 12/2019 | Pugaczewski | |
| 10,652,099 B2 | 5/2020 | Bae et al. | |
| 2009/0274052 A1* | 11/2009 | Howarter | ........... H04L 41/0668 370/242 |
| 2010/0124176 A1* | 5/2010 | Fan | ......................... H04L 45/02 370/250 |
| 2018/0219753 A1 | 8/2018 | Arsenie et al. | |
| 2018/0302266 A1* | 10/2018 | Makovsky | .............. H04L 41/22 |

(Continued)

FOREIGN PATENT DOCUMENTS

EP 2674876 A1 12/2013

OTHER PUBLICATIONS

Wollenweber, Kevin, "Cisco Announces Intent to Acquire Accedian: Accelerating High Performance Service Assurance", Jun. 21, 2023, 9 pages, Cisco Systems, Inc.

*Primary Examiner* — Raqiul A Choudhury

(74) *Attorney, Agent, or Firm* — Lee & Hayes, P.C.

(57) ABSTRACT

In one implementation, a method herein comprises: determining a given time during which a computer network is unstable in response to a topology event within the computer network; causing, in response to the computer network being unstable, a measurement analysis process to perform network performance analysis on the computer network based on the computer network being unstable during the given time; and causing, in response to determining that the computer network is otherwise in a stable state, the measurement analysis process to perform network performance analysis on the computer network based on the computer network being stable.

20 Claims, 6 Drawing Sheets

(56)         References Cited

U.S. PATENT DOCUMENTS

2019/0372858 A1*  12/2019  Krishnamurthy ..... H04L 45/033
2021/0271506 A1*   9/2021  Ganguly ................. H04L 41/04
2024/0143433 A1*   5/2024  Verma ................... G06F 11/079

* cited by examiner

100

PERFORMANCE MEASUREMENT ANALYTICS PLATFORM BASED ON TOPOLOGY STABILITY

TECHNICAL FIELD

The present disclosure relates generally to computer systems, and, more particularly, to a performance measurement analytics platform based on topology stability.

BACKGROUND

Performance measurement analytics platforms are often provided for computer networks in order to monitor the performance of the computer network. Many of these performance measurement platforms measure the performance of the computer network in terms of telemetry metrics such as loss, latency, and liveness, to determine the evolution of the computer network performance over time and identify any performance degradation over time. Examples of loss include packet loss (e.g., dropped packets) and network throughput, among others. Latency, on the other hand, is generally measured in terms of the delay network communications, while liveness is generally determined based on the network heartbeat.

While the telemetry metrics and their timing information can provide valuable insights to network operators regarding the performance of the computer network, it is possible that the platform may exhibit false positives and/or negatives regarding these metrics. Increasingly, network operators do not have the time and/or expertise to sort through false positives and/or false negatives regarding the loss, latency, and liveness of the computer network, to determine if corrective action should be taken, which can lead to increased time to issue resolution, degraded product and network performance, and increased wasting of computational resources.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more implementations of the disclosure, techniques are introduced herein that provide a performance measurement analytics platform based on topology stability. In particular, the techniques herein first determine a given time during which a computer network is unstable based on a topology event within the computer network. A measurement analysis process may then correspondingly perform network performance analysis on the computer network based on the computer network being unstable during the given time. Otherwise, in response to determining that the computer network is in a stable state, the measurement analysis process may perform network performance analysis on the computer network based on the computer network being stable.

Other implementations are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
FIG. 1 illustrates an example computer network.
Figure 1:
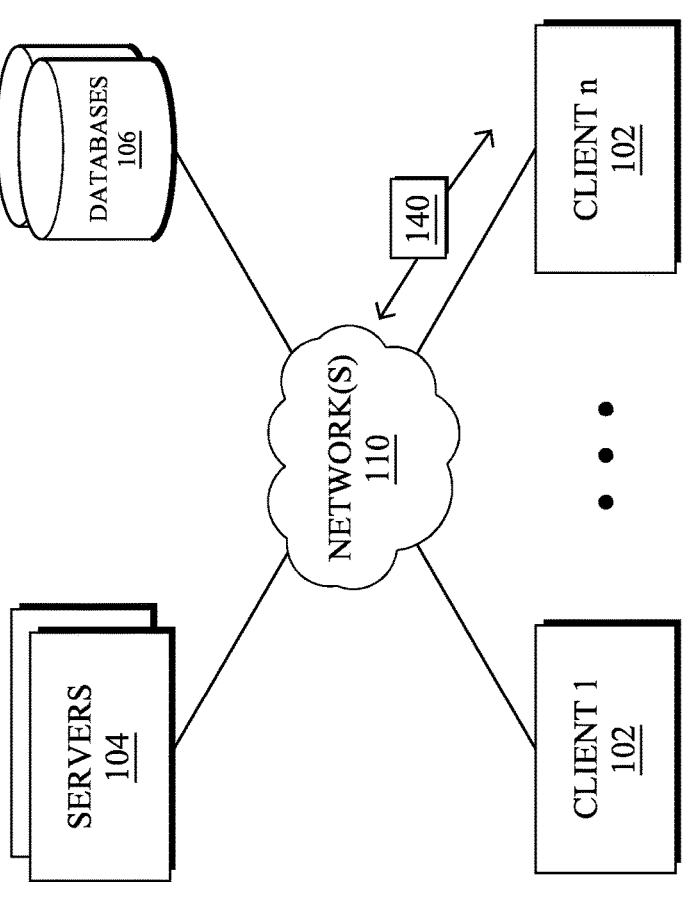

FIG. 1 is a schematic block diagram of an example simplified computing system 100 illustratively comprising any number of the client devices 102 (e.g., a first through n'h client device), one or more of servers 104, and one or more of databases 106, where the devices may be in communication with one another via any number of networks (e.g., networks 110). The one or more networks (e.g., networks 110) may include, as would be appreciated, any number of specialized networking devices such as routers, switches, access points, etc., interconnected via wired and/or wireless connections. For example, devices 102-104 and/or the intermediary devices in network(s) (e.g., networks 110) may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) (e.g., networks 110).

Notably, in some implementations, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in simplified computing system 100, and that the view shown herein is for simplicity. Also, those skilled in the art will further understand that while the network is shown in a certain orientation, the simplified computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
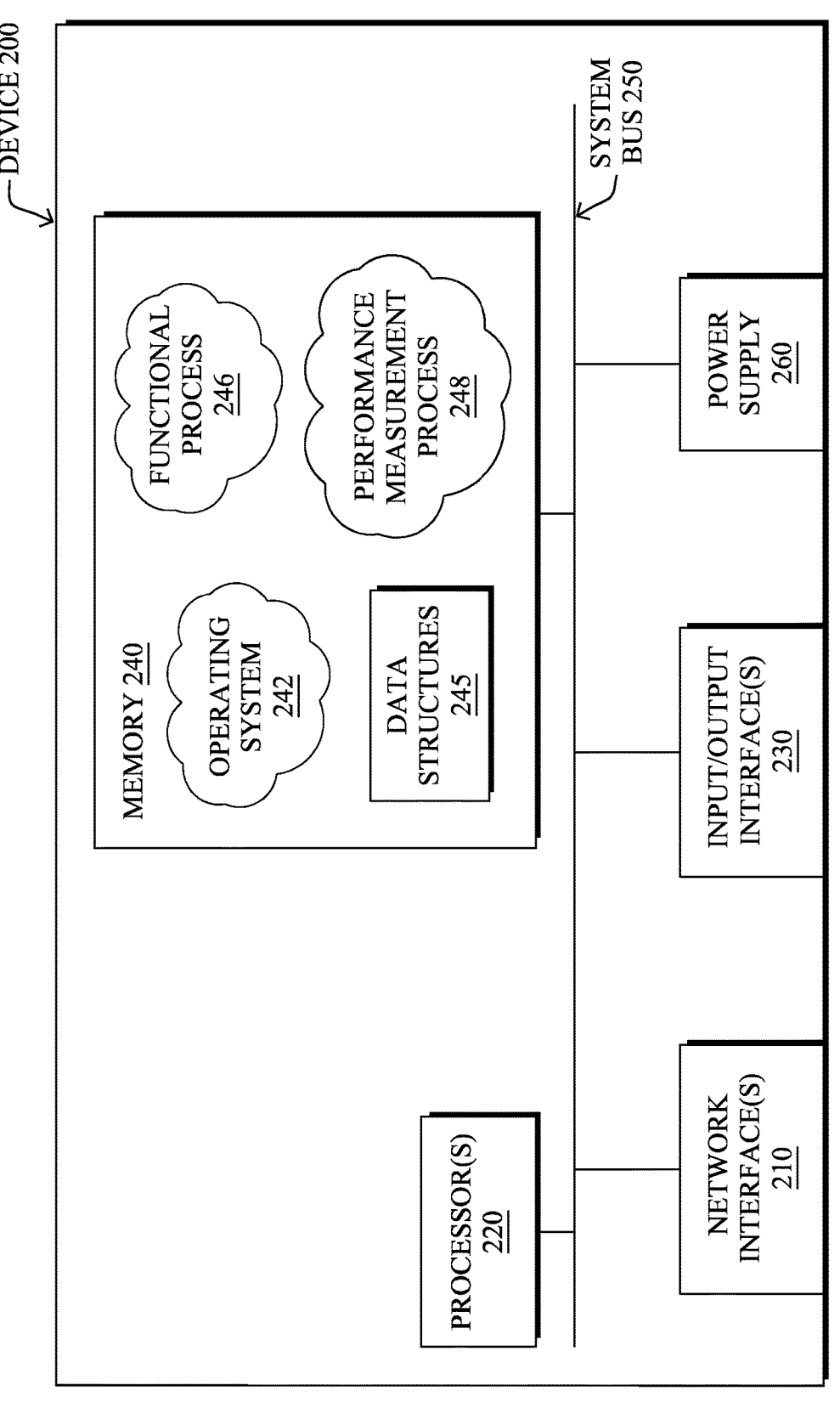
FIG. 2 illustrates an example computing device/node.

FIG. 2 is a schematic block diagram of an example node/device 200 that may be used with one or more implementations described herein, e.g., as any of the devices 102-106 shown in FIG. 1 above. Device 200 may comprise one or more network interfaces (e.g., network interfaces 210) (e.g., wired, wireless, etc.), at least one processor (e.g., processor 220), and a memory 240 interconnected by a system bus 250, as well as a power supply 260 (e.g., battery, plug-in, etc.).

The network interface(s) (e.g., network interfaces 210) contain the mechanical, electrical, and signaling circuitry for communicating data over links coupled to the network(s) (e.g., networks 110). The network interfaces may be configured to transmit and/or receive data using a variety of different communication protocols. Note, further, that device 200 may have multiple types of network connections via network interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the implementations described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more of functional processes 246, and on certain devices, an illustrative "performance measurement" process (e.g., performance measurement process 248), as described herein. Notably, functional processes 246, when executed by processor(s) (e.g., processor 220), cause each particular device (e.g., device 200) to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

In some implementations, the functional processes 246 can include routing processes, which can include computer executable instructions executed by one or more processors, e.g., the processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), Border Gateway Protocol Link-State (BGP-LS), etc., as will be understood by those skilled in the art. These functions may be configured to manage a forwarding information database including, e.g., data used to make forwarding decisions. In particular, changes in the network topology may be communicated among devices 200 using routing protocols, such as the conventional OSPF and IS-IS link-state protocols (e.g., to "converge" to an identical view of the network topology).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

——Observability Intelligence Platform——

Distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more implementations herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a web-site is loading, how an application is performing, how a particular business transaction (or a particular type of business transaction) is being effected, and so on, whether for individual devices, a category of devices (e.g., type, location, capabilities, etc.), or any other suitable implementation of categorical classification.

Figure 3:
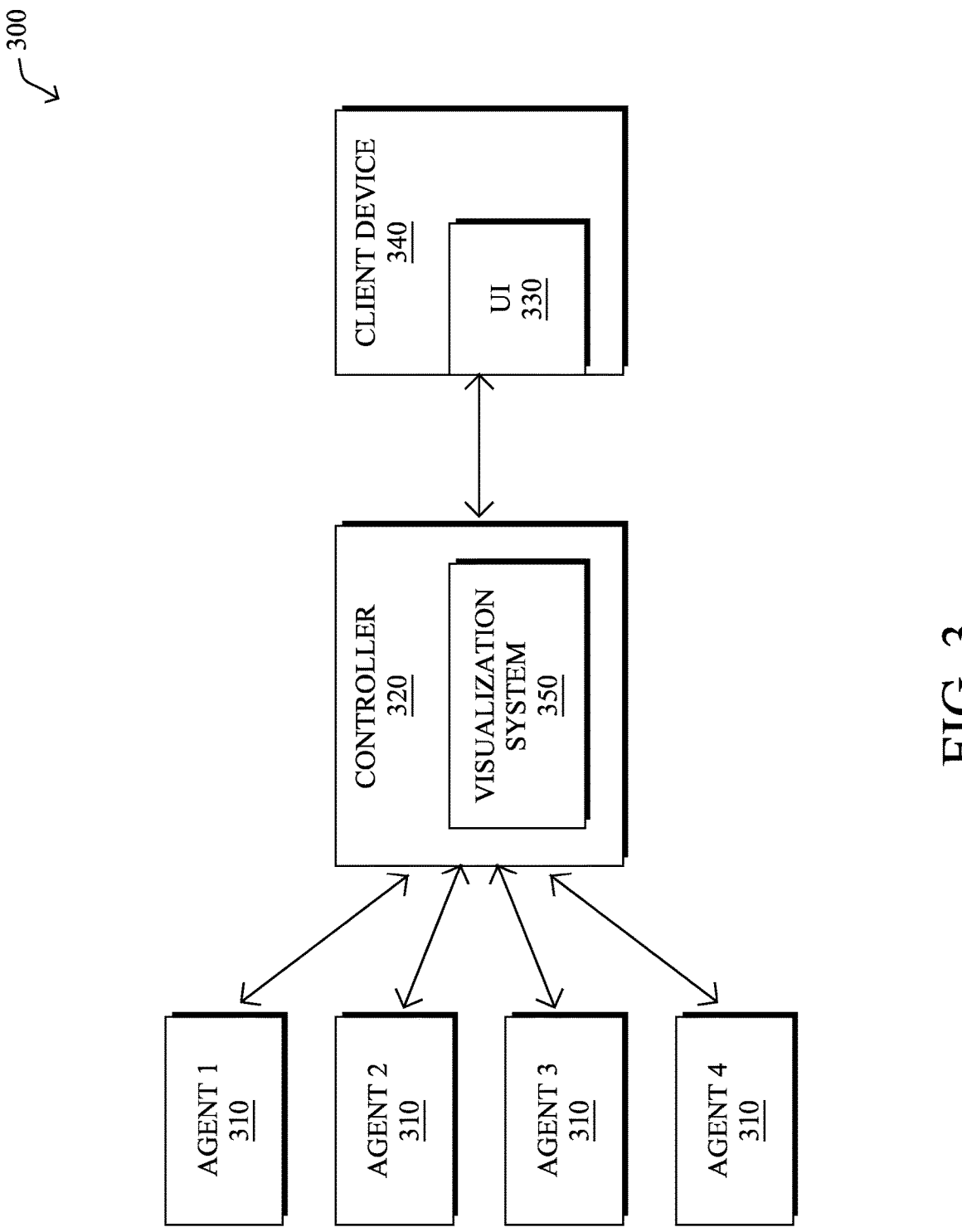
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more of agents 310 and one or more servers/controllers (e.g., controller 320). Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) (e.g., controller 320) as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page— e.g., load a shopping website, log in, search for an item, add it to the shopping cart, etc.).

The controller 320 is the central processing and administration server for the observability intelligence platform. The controller 320 may serve a browser-based user interface (UI) (e.g., interface 330) that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance (e.g., controller 320) may be hosted remotely by a provider of the observability intelligence platform 300. In an illustrative on-premises (On-Prem) implementation, a controller instance (e.g., controller 320) may be installed locally and self-administered.

Controllers 320 receive data from different agents (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain implementations, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one implementation, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain implementations, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the extensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

——Performance Measurement Analytics Platform based on Topology Stability——

As noted above, performance measurement platforms that measure loss, latency, and liveness based on measurement data and time can return false positives and/or false negatives regarding the loss, latency, and liveness of a computer network. These undesirable false positives and/or false negatives can occur more frequently as the size and quantity of devices in the computer network continue to grow. This can lead to a network operator spending more time to identify and resolve issues in addition to degraded product and network performance and increased wasting of computational resources.

For example, communication service providers (CSPs), webscalers, and others are experiencing increasing subscriber expectations and stringent performance requirements that often demand real-time data and actionable insights to ensure that a computer network performs as expected. To this end, performance measurement solutions that measure the evolution of the computer network performance in terms of loss, latency, and liveness over time are employed to show network degradation. However, as mentioned above, in merely considering the evolution of measurement data over time, these current approaches overlook potentially valuable information such as routing information and/or the stability of the network topology over time.

As described in more detail herein, implementations of the present disclosure provide a performance measurement solution that integrates the routing information and the stability of the topology. This solution therefore defines a new concept called "stable topology" (and, conversely, an "unstable topology"). In some implementations, the measurement data is analyzed based on the stable topology (per-path and/or per-domain basis) in which the measurement data was collected, thereby providing a network operator with the issues that matter (e.g., actionable insights) by filtering out false positive events and/or false negative events that happens during periods of unstable topology.

The techniques herein therefore provide for a platform or "framework" for performance analytics measurement that is additionally based on topology stability. That is, as described in more detail herein, in contrast to previous approaches that merely measure loss, latency, and liveness based on measurement data and time, implementations of the present disclosure further consider routing information and the stability of the network topology during network analysis. For example, as a result of ignoring the routing information and stability of the topology, existing performance measurement platforms can provide false positives and/or false negatives during shifts in topology, which can leave a network operator blind as to the actual root cause of an issue.

For example, if a network communication path between devices in two cities (e.g., San Francisco and New York City) is having periodic latency degradation, it may be interpreted under current approaches as a fiber and/or buffering issue. However, the real issue could be a network layer issue and/or an interface flapping issue causing the interior gateway protocol (IGP) path to change. Accordingly, measurements made during periods of topology change and/or IGP convergence should not be considered as they can lead to many false positives and/or false negatives, which could lead the network operator to act wrongly based on the measurement data collected during an instability period.

As an example, relying merely on the evolution of the measurement data over time in the absence of a correlation with routing information may leave a network operator blind with regard to the stability of the topology of the network and/or the path over which communications are routed. For example, suppose that one of the routing paths in a network between San Francisco (SFO) and New York City (NYC) was showing expected latency until 9:00 AM, and then from 9:00 AM until 9:02 AM the routing path exhibits a degraded latency and/or some packet loss. Now suppose that at 9:02

AM the packet loss issue disappeared, and the latency improved; however, they did not return to the values expected before 9:00 AM.

Without the routing information, this scenario can typically be translated by the operator as a buffering issue from 9:00 AM to 9:02 AM that caused increased latency and some packet loss due to a buffering tail-drop. In addition, it may show that there is an ongoing issue as the routing path may still be reporting latency higher than the expected latency before 9:00 AM. However, the actual reason for the degraded latency and/or packet loss could be that a topology change occurred at 9:00 AM and the routing path from SFO-NYC changed to another routing path that has higher latency and/or packet loss and the issue was in fact due to interior gateway protocol (IGP) reconvergence. In this scenario, the new routing path has higher expected latency and, hence, the routing path should not be reported as having an issue. In this manner, the lack of routing information, coupled with the topology/path change and/or stability change can lead to false positives and/or false negatives, which may lead the network operator to act incorrectly based on measurement data collected during an unstable topology period.

In contrast, implementations of the present disclosure provide a performance measurement platform that integrates the routing information and stability of the topology to avoid any false positives and/or false negatives. As will be discussed in more detail below, this platform provides to the network operator the issues that matter and filters out misleading information (which may result in such false positives and/or false negative events) that happens during the period of unstable topology.

As discussed in more detail herein, the stability of the topology (on a per-path and/or per-domain basis) can be an important metric that can be taken into consideration for performance measurements. For example, in some implementations, performance measurements of a given metric (e.g., loss, latency, and/or liveness) can be measured based on the stability of the topology. Otherwise, as mentioned above, there is a risk that measurement data from period of time that exhibit different topology stabilities could be incorrectly interpreted as network degradation.

Accordingly, implementations described herein provide for a performance measurement analytics platform based on topology stability that allows for the integration of routing information and/or the stability of the network topology. As a result, methodologies to process measurement data based on a stable topology on a per-domain and/or per-path basis, where a per-domain stable topology defines the stability of the topology in a given domain while a per-path basis defines the stability of the path between two given nodes. In some implementations, measurement data is analyzed on a stable topology (on the per-domain basis and/or the per-path basis) in which the measurement data was collected. In addition, implementations described herein allow for processing of measurement data based on the stable topology concept to provide a network operator with information corresponding to issues that matter by filtering out false positive events and/or false negative events that may happen during periods of unstable topology.

Illustratively, the techniques described herein may be performed by hardware, software, and/or firmware, such as in accordance with performance measurement process 248, which may include computer executable instructions executed by the processor 220 (or independent processor of network interfaces 210) to perform functions relating to the techniques described herein.

Specifically, according to various implementations, an illustrative method herein may comprise: determining, by a device, a given time during which a computer network is unstable in response to a topology event within the computer network; causing, by the device and in response to the computer network being unstable, a measurement analysis process to perform network performance analysis on the computer network based on the computer network being unstable during the given time; and causing, by the device and in response to determining that the computer network is otherwise in a stable state, the measurement analysis process to perform network performance analysis on the computer network based on the computer network being stable.

Figure 4:
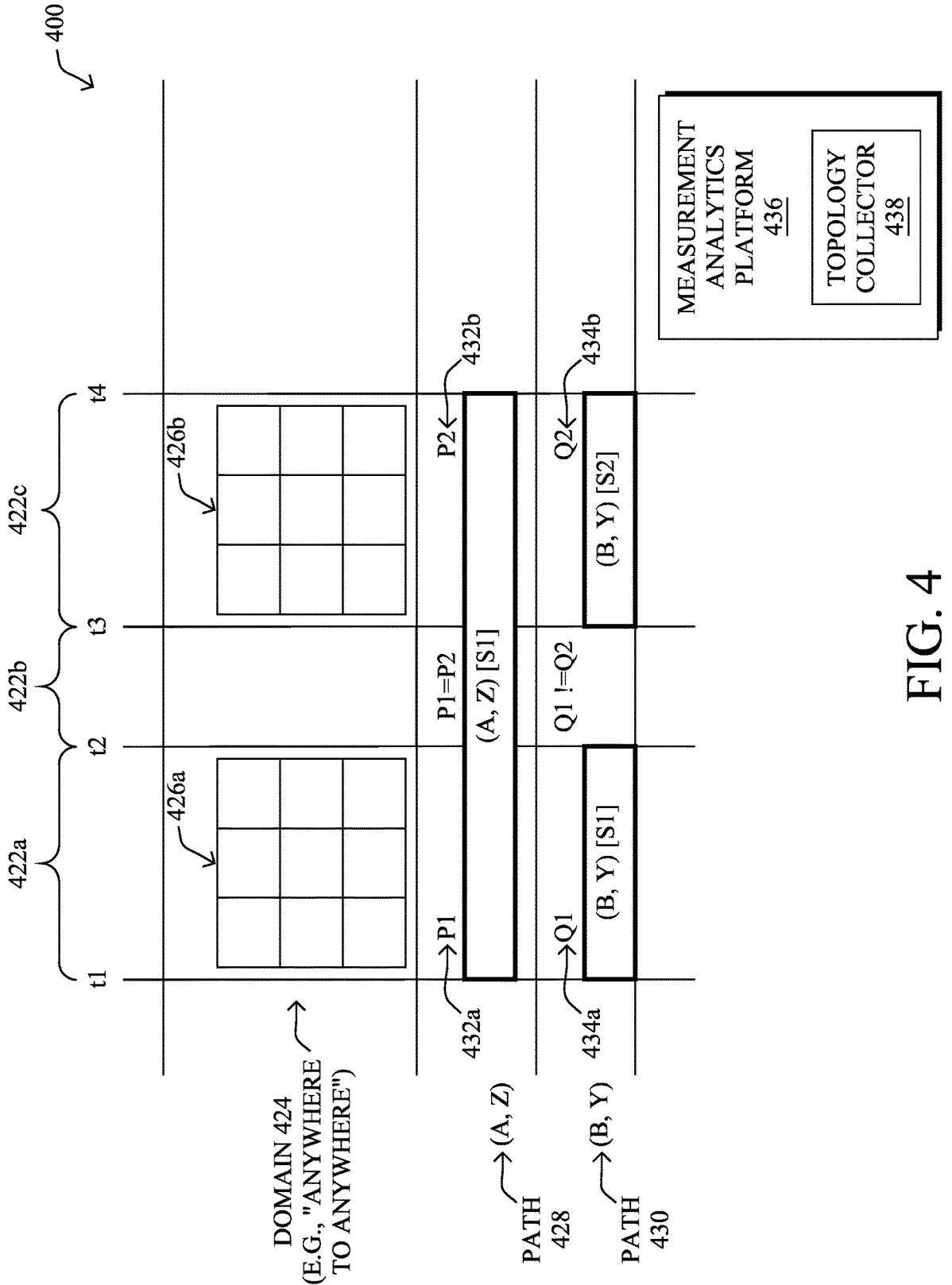
FIG. 4 illustrates an example of a network topology over time in accordance with the disclosure.

Operationally and according to various implementations, FIG. 4 illustrates an example visualization 400 of a computer network over time in accordance with the disclosure. The computer network can be analogous to the networks 110 of FIG. 1. As shown in FIG. 4, the computer network includes a network topology for a domain 424 that is shown as a first network topology 426a between times t1 and t2 (time period 422a), which transitions between times t2 and t3 (time period 422b) to a second network topology 426b between times t3 and t4 (time period 422b). Notably, the computer network (e.g., the domain 424) can include various assets (e.g., computers, security groups, user objects, printers, and/or Internet-of-Things devices, etc.). In addition, the visualization 400 also includes a representation of a measurement analytics platform 436 and a topology collector 438, which are communicatively coupled to the computer network for monitoring network performance and topology events in accordance with embodiments of the techniques herein, accordingly.

As shown in FIG. 4, the visualization 400 of the computer network over time shows not only the domain 424, which represents communications from anywhere to anywhere (e.g., from any source to any destination within the domain 424), but also visualizations of node-to-node paths such as path 428 for node pair (A. Z) and path 430 for node pair (B. Y), as further described below.

In order to consider the stability of the computer network, as well as routing information (e.g., a correlation between measurement data and the routing information) when providing measurement analytics as part of the performance measurement analytics platform described herein, the techniques herein consider periods of time when the network topology is stable and periods of time when the first network is unstable. By identifying periods of time when the network topology is unstable, measurement data collected during the unstable periods of time may be filtered out, because measurement analytics (also referred to herein as "measurement data" or "measurement analytics data") collected during time periods when the network is unstable may lead to false positives and/or false negatives, thereby reducing or eliminating false positive events and/or false negative events associated with performance measurement analytics for the network.

In some implementations, whether or not the topology of the computer network is stable or unstable can be determined based on information collected from a topology collector 438 (e.g., hardware configured to detect topology events and/or instructions executable by hardware to detect topology events) using, for example, a border gateway protocol link-state (BGP-LS) monitoring protocol, a border gateway protocol (BGP) monitoring protocol, or the like. For instance, in response to an update to a topology, such as a routing table change, virtual routing and forwarding (VRF) update, VLAN configuration change, or other topology events as may be appreciated by those skilled in the art, the techniques herein may detect such a topology event and may correspondingly consider the topology unstable during that change, as described herein.

In the example of FIG. 4, a measurement analytics platform 436 (e.g., the device 200, the performance measurement process 248, etc.) may be provided access to routing information (e.g., of a stable topology) in the network, as well as a full topological view of the network and a list of routing paths associated with the network.

If there are no changes detected in the topology of the computer network by the topology collector 438, such as for time period 422*a* between t1 and t2, the measurement analytics platform 436 collects and analyzes (or otherwise processes and/or post-processes) measurement data during such times of stability to detect any loss, latency, and/or liveness issues associated with the computer network (i.e., first network topology 426*a*). The information collected by the measurement analytics platform 436, such as the measurement data and the routing data, may be saved to the (current) stable topology of the network.

If a change to the stable topology is detected, such as at t2, then the techniques herein declare that the transition time during that change (e.g., the time it takes the network to converge) to be a period of an unstable topology, such as time period 422*b* between t2 and t3. In one embodiment, since it may be difficult to know precisely how long it takes for a network to converge in response to a topology change event, once the topology collector 438 determines that the topology of the network has become unstable, a timer may be initiated for a predetermined period of time (e.g., one minute, two minutes, three minutes, etc.). In addition, a notification is propagated to the measurement analytics platform 436 to indicate that the topology of the network is currently unstable and the measurement analytics platform 436 should cease collection of measurement data until the timer has expired (e.g., decremented to zero) or until it is determined that the topology of the network has become stable again (e.g., at time t3 where the topology is stable again as the second network topology 426*b* at least for time period 422*c* from t3 to t4).

Notably, if a subsequent topology change is detected prior to the timer decrementing to zero (e.g., expiring), the timer may be reset to its initial value (e.g., one minute, two minutes, three minutes, etc.) to allow for the topology to converge based on the new update in order to become stable again. In any event, once the timer has decremented to zero (e.g., has expired), the topology collector 438 may determine that the topology of the network is stable and the measurement analytics platform 436 may resume collection of measurement data. This process may be iterative and/or may be initiated whenever a change in the topology of the network is detected.

In some implementations, the topology of the computer network is considered to be stable when there is no change across the entirety of domain 424 (e.g., on a "per-domain basis" that considers the entire domain). (Or, conversely, the topology of the computer network is considered to be unstable when there is any change within the domain 424.) This may be useful, for example, for some applications like fast reroute (FRR) where measurement analytics needs to compute whether every node and link in the domain 424 is protected.

However, for other applications, such as measurement analytics applications that measure network paths and, hence, the loss, latency, and/or liveness of such network paths, it may be determined that the topology of the computer network is stable based on a "per node-to-node basis" that considers interactions between nodes of the network, such as, for example, as shown in FIG. 4, a path 428 between an (A,Z) pair or nodes and a path 430 between a (B,Y) pair of nodes where the measurement analytics application is enabled. That is, for measurement analytics applications, such as those executed by the measurement analytics platform 436, a topology change (e.g., a node failure, interface failure, etc.) that does not impact a particular may be inconsequential to another pathway. Stated alternatively, a topology change (e.g., a node/interface failure) in New York City may not affect a path between devices communicating from San Francisco to San Jose, even if all of these devices are in the same domain (e.g., domain 424).

In order to more clearly and concisely elucidate aspects of the present disclosure, a simplified, non-limiting example is provided below. For this non-limiting example, it is assumed that, as shown in FIG. 4, a domain 424 has measurement analytics enabled between a first pair of devices (the (A,Z) pair for path 428) and a second pair of devices (the (B,Y) pair for path 430. In addition, the domain 424 has two periods of stable topologies: the first network topology 426*a* during the time period 422*a*, and the second network topology 426*b* during the time period 422*c*. It is noted that, in this non-limiting example, there is a period of unstable topology between the two, i.e., the time period 422*b*.

During the first period of time when the topology is stable, i.e., the time period 422*a*, the path 428 provided for the (A,Z) pair for communication is referenced as path 432*a* (P1). In addition, during the first period of time when the topology is stable, the path 430 provided for the (B,Y) pair for communication is referenced as path 434*a* (Q1). After the period of instability (i.e., unstable topology during time period 422*b*), and thus during the period of time when the topology is again stable (i.e., the time period 422*c* where the second network topology 426*b* is stable), the path 428 provided for the (A,Z) pair for communication is now referenced as path 432*b* (P2) and the path 430 provided for the (B,Y) pair for communication is now referenced as path 434*b* (Q2).

For purposes of this non-limiting example, and as shown in FIG. 4, it can be determined through comparative analysis that the path 432*a* (P1) is the same as the path 432*b* (P2) after the convergence, but that the path 434*a* (Q1) is not the same as the path 434*b* (Q2). That is, the routing information and/or routing path for the (A,Z) pair is the same during both periods of stable network topology while the routing information and/or routing path for the (B,Y) pair is different between the two periods of stable network topology. This may be due to a failure in a node, an interface, etc. occurring along the routing path for the (B,Y) pair, although examples are not so limited.

Continuing with this non-limiting illustrative example, it is noted that the path 428 for the (A,Z) pair experiences a single, stable topology (S1) from the t1 through t4 (i.e., P1 equals P2 from time period 422*a* through the time period 422*c*). This may be due to the fact that the routing information and/or routing path for the (A,Z) pair had not changed between both periods of stable network topology. Accordingly, the measurement analytics platform 436 collects/processes the measurement data for the path 428 for the (A,Z) pair from the time period 422*a* through the time period 422*c*, inclusive of time period 422*b*, as the topology of that particular path has been deemed to be stable for that entire time. Alternatively, such as for post-processing of the data, the measurement analytics platform 436 may determine that the measurement data that was collected for the path 428 for the (A,Z) pair during the time period 422a through the time period 422c, inclusive of the time period 422b, is all valid measurement data due to the network topologies associated with the (A,Z) pair being stable the entire time therein.

On the other hand, because the path 430 for the (B,Y) pair experiences two distinct stable network topologies (Q1 does not equal Q2-namely a first stable topology period S1 during time period 422a and a second different topology period S2 during time period 422c) the measurement analytics platform 436 only collects/processes measurement data for the path 430 for the (B. Y) pair during the time period 422a and time period 422c, ignoring (filtering, ceasing to process/collect, declaring invalid, etc.) the data for time period 422b (i.e., the unstable topology period for path 430). For post processing, the measurement analytics platform 436 may collect measurement data for the path 430 for the (B,Y) pair for the entire time, but then determine that the measurement data collected during time period 422b is invalid due to the network topology being unstable. In such implementations, the measurement analytics platform 436 may filter out or otherwise discard measurement data collected during the time period 422b, accordingly.

As a result, in some implementations, the measurement data is analyzed based on the stability of the topology (on a per-path and/or per-domain basis, as discussed above) in which the measurement data was collected. Accordingly, between two given nodes, such as the (A,Z) pair or the (B,Y) pair, the measurement analytics data may show:

A timeline of stable topologies between node A and node Z (or between node B and node Y, etc.);

A classification (e.g., no issues, minor issues, critical issues, etc.) of data points collected during a given period of stable topology based, at least in part, on the measurement data and a correlation with the routing information;

A comparison of a last measurement (e.g., a most recently obtained data point) with other measurement data collected during a period of stable topology; and/or A comparison of a last measurement (e.g., a most recently obtained data point) with other measurement data collected during a particular time period, such as a same time, same day of the week, etc.

Accordingly, the measurement analytics data collected in accordance with implementations herein may highlight a deviation of the last measurement compared to other measurement data collected during a (current) stable topology.

Figure 5:
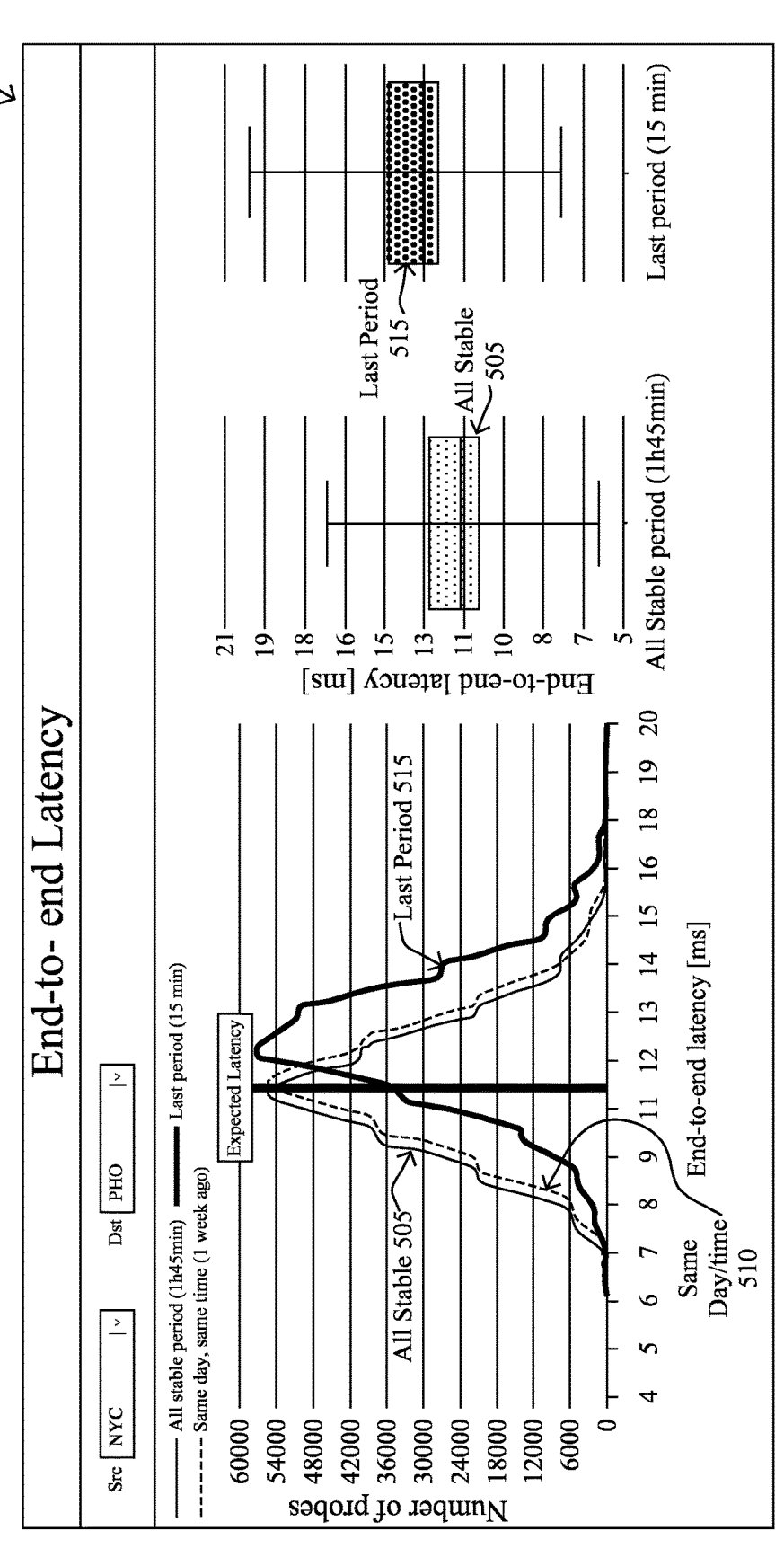
FIG. 5 illustrates an example of a dashboard for a performance measurement analytics platform based on topology stability.

FIG. 5 illustrates an example of a dashboard 500 for a performance measurement analytics platform based on topology stability. In particular, through viewing end-to-end latency for a number of topologies (e.g., a path between NYC and PHO) it can be seen that the aggregate of all stable topologies generally have a consistent graph of latency 505 for probed performance metrics through that topology, and by comparing the same day/time graph of latency 510, it can be seen that only a slight variation has occurred. However, by separating out last period's latency 515, it can be seen clearly that there is an anomaly in terms of increased latency. However, according to the techniques herein, it may be determined that the last period was, in fact, due to an unstable network topology (e.g., a change in the path between NYC and PHO), and therefore such associated performance metrics may be isolated and removed (or otherwise treated differently) from the overall assessment of end-to-end latency for that path, as the increase in latency is reflective of the instability/convergence of the topology rather than an indication of an actual issue of concern. (Those skilled in the art will appreciate that FIG. 5 is meant merely as an example demonstration of how metrics may be affected by unstable topologies, and is not meant to be limiting to the scope of the present disclosure.)

Figure 6:
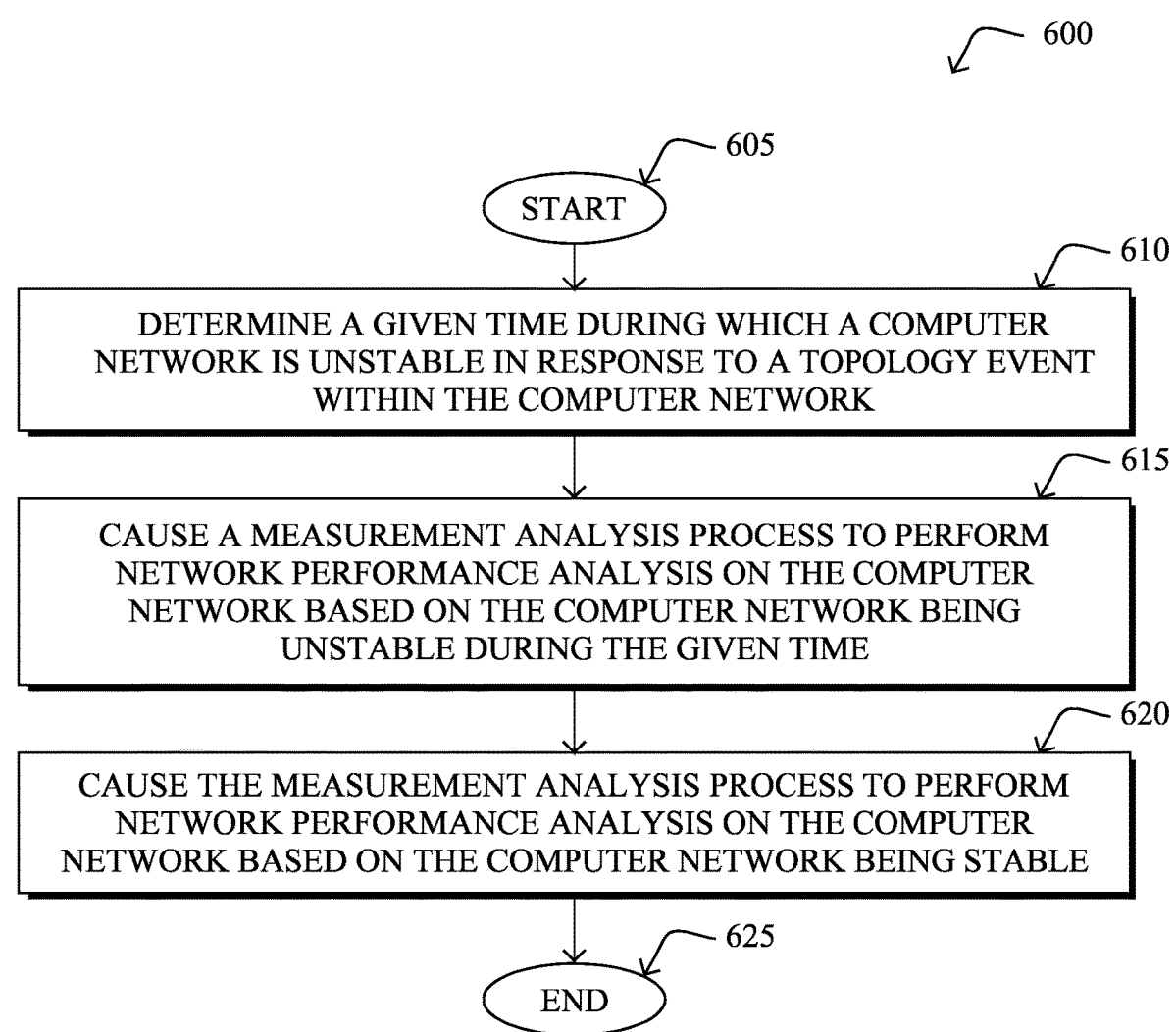
FIG. 6 illustrates an example simplified procedure for a performance measurement analytics platform based on topology stability.

FIG. 6 illustrates an example simplified procedure for a performance measurement analytics platform based on topology stability. For example, a non-generic, specifically configured device (e.g., device 200, or other apparatus) may perform procedure 600 (e.g., a method or process) by executing stored instructions (e.g., performance measurement process 248). Alternatively, a tangible, non-transitory, computer-readable medium may have computer-executable instructions stored thereon that, when executed by a processor on a computer, cause the computer to perform a method according to procedure 600.

Procedure 600 may start at step 605, and continues to step 610, where, as described in greater detail above, a device determines a given time during which a computer network is unstable in response to a topology event within the computer network. For example, the device may monitor the computer network to detect the topology event and/or may obtain information corresponding to the topology event from a topology collector. In implementations in which the device obtains information corresponding to the topology event from a topology collector, the information corresponding to the topology event may be obtained from the topology collector using a border gateway protocol link-state (BGP-LS) or a border gateway protocol (BGP) monitoring protocol.

In some implementations, a timer can be initiated in response to the topology event within the computer network and it can be determined that the computer network returns to a stable state is in response to expiration of the timer without another topology event having occurred. In such implementations, the timer can be reset in response to another topology event prior to expiration of the timer to continue identifying the computer network as unstable.

The procedure 600 can further include determining that the computer network is unstable in response to the topology event within the computer network based on receiving a first notification from a topology event monitoring process that the computer network is unstable and determining that the computer network returns to the stable state based on receiving a second notification from the topology event monitoring process that the computer network returned to the stable state.

At step 615, as detailed above, the device causes a measurement analysis process to perform network performance analysis on the computer network based on the computer network being unstable during the given time. In various implementations, the device causes the measurement analysis process to perform network performance analysis on the computer network on the computer network in response to the computer network being unstable and while the computer network is unstable, although implementations are not so limited. For example, as discussed above, the device may cause the measurement analysis process to perform network performance analysis on the computer network continuously and then may filter out or otherwise discard measurement data that is collected during periods when the computer network is unstable.

In some implementations, it can be determined that the computer network is unstable by determining a specific portion of the computer network that is unstable and the measurement analysis process can perform network performance analysis on the computer network based on the computer network being unstable by causing the measurement analysis process to perform network performance analysis on the specific portion of the computer network based on the specific portion of the computer network being unstable. In such implementations, the specific portion of the computer network can be a particular network domain of the computer network or a particular pathway between nodes of the computer network. As discussed above, the topology event can be a change in the network topology. In such implementations, the device can compare a new network topology to an old network topology and determine the specific portion (that changed and was thus unstable) based on determined changes in the network topology during the topology event.

At step 620, as detailed above, the device causes the measurement analysis process to perform network performance analysis on the computer network based on the computer network being in an otherwise stable state. In some implementations, the device causes the measurement analysis process to perform network performance analysis on the computer network in response to determining that the computer network is otherwise in a stable state. As discussed above, causing the measurement analysis process to perform network performance analysis can include determining unstable and stable states of the computer network.

In some implementations, performing network performance analysis on the computer network based on the computer network being unstable may include filtering measurement data collected for the computer network during the given time. For example, measurement data may be collected continuously during periods in which the network topology is stable and unstable, and the measurement data collected during periods in which the network topology is unstable may be filtered or otherwise discarded. In some implementations, network performance analysis may be performed on the computer network based on the computer network being unstable by stopping processing of measurement data for the computer network. In such implementations, performing network performance analysis on the computer network based on the computer network being unstable can include filtering alerts raised based on processing of measurement data for the computer network while unstable. Conversely, network performance analysis may be performed on the computer network based on the computer network being stable by continuing to process measurement data for the computer network. In such implementations, performing network performance analysis on the computer network based on the computer network being stable can include processing measurement data to determine loss, latency, and/or liveness issues in the computer network.

Procedure 600 then ends at step 625.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

The techniques described herein, therefore, provide a performance measurement platform that integrates the routing information and stability of the topology into the performance measurement analysis. By integrating the routing information and the stability of the topology into the performance measurement analysis, false positives and/or false negatives may be reduced or even eliminated. In addition, by collecting measurement data (or "measurement analytics") based on whether to not the network topology is stable and providing a mechanism to filter out measurement data collected during periods of unstable network topology, false positives and/or false negatives may be reduced or even eliminated.

Further, by providing a per-domain stable topology mechanism for analytics that requires domain wide view such as fast reroute (FRR) analytics in addition to a per node-to-node stable topology for analytics that are concerned with network measurements between two gives nodes, such as measurement analytics applications where the concern is the path change between the two nodes false positives and/or false negatives may be reduced or even eliminated in multiple scenarios that may arise in computer networks.

These techniques therefore can allow for a more accurate view of computer network performance to be provided to a network operator, thereby improving network troubleshooting and/or response times to remedy issues that may arise in the computer network.

While there have been shown and described illustrative implementations that provide a performance measurement analytics platform, it is to be understood that various other adaptations and modifications may be made within the spirit and scope of the implementations herein. For example, while certain implementations are described herein with respect to using the techniques herein for certain purposes, the techniques herein may be applicable to any number of other use cases, as well. In addition, while certain types of scripting languages and common data formats are discussed herein, the techniques herein may be used in conjunction with any scripting language or common data format. Also, while certain configurations and layouts of graphical representations have been shown herein, other types not specifically shown or mentioned may also be used, and those herein are merely examples.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (nontransitory) computer-readable medium (e.g., disks/CDs/ RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

What is claimed is:

1. A method, comprising:

receiving measurement data from application agents of devices in a computer network;

receiving network topology information related to stability of a topology associated with the devices in the computer network;

determining, based at least in part on the network topology information, a given time period during which the computer network exhibits an unstable topology;

filtering the measurement data to remove a portion of the measurement data corresponding to the given time period of the unstable topology of the computer network, producing filtered measurement data that correspond to one or more stable topology periods of the computer network;

causing a measurement analysis process to perform network performance analysis on the filtered measurement data of the computer network during the one or more periods of stable topology; and analyzing the network performance analysis to determine whether a deviation of the measurement data has occurred compared to previous measurement data collected during a previous stable topology period of the computer network.

2. The method as in claim 1, further comprising:

determining from the network topology information that the computer network is unstable by determining a specific portion of the computer network that is unstable during the given time period.

3. The method as in claim 2, wherein the specific portion comprises one of a particular network domain of the computer network or a particular pathway between the devices of the computer network.

4. The method as in claim 2, further comprising:

determining from the network topology information that a topology event has occurred within the computer network, wherein the topology event comprises a change in the topology; and determining the specific portion based at least in part on the change in the topology during the topology event.

5. The method as in claim 1, further comprising:

determining from the network topology information that a topology event has occurred within the computer network;

initiating a timer in response to the topology event within the computer network; and in a first instance, determining that the given time period of the unstable topology has ended based at least in part on an expiration of the timer without another topology event having occurred.

6. The method as in claim 5, further comprising:

in a second instance, resetting the timer in response to another topology event prior to the expiration of the timer to continue identifying the computer network as unstable.

7. The method as in claim 1, wherein:

determining the given time period during which the computer network exhibits the unstable topology is based at least in part on receiving a first notification from a topology event monitoring process that the computer network is unstable, and determining that the given time period has ended is based at least in part on receiving a second notification from the topology event monitoring process that the computer network is stable.

8. The method as in claim 1, further comprising:

monitoring the computer network to collect the network topology information; and based at least in part on the network topology information, detecting a topology event corresponding to the given time period.

9. The method as in claim 1, further comprising:

obtaining information corresponding to a topology event from a topology collector.

10. The method as in claim 9, further comprising:

using a border gateway protocol link-state or a border gateway protocol monitoring protocol to obtain the information corresponding to the topology event from the topology collector.

11. The method as in claim 1, wherein performing network performance analysis on the computer network comprises:

processing measurement data to determine at least one issue with loss, latency, or liveness in the computer network.

12. A tangible, non-transitory, computer-readable medium having computer-executable instructions stored thereon that, when executed by a processor on a computer, cause the computer to perform a method comprising:

receiving measurement data from application agents of devices in a computer network;

receiving network topology information related to stability of a topology associated with the devices in the computer network;

determining, based at least in part on the network topology information, a given time period during which the computer network exhibits an unstable topology;

filtering the measurement data to remove a portion of the measurement data corresponding to the given time period of the unstable topology of the computer network, producing filtered measurement data that correspond to one or more stable topology periods of the computer network;

causing a measurement analysis process to perform network performance analysis on the filtered measurement data of the computer network during the one or more periods of stable topology; and analyzing the network performance analysis to determine whether a deviation of the measurement data has occurred compared to previous measurement data collected during a previous stable topology period of the computer network.

13. The tangible, non-transitory, computer-readable medium as in claim 12, wherein the method further comprises:

determining from the network topology information that the computer network is unstable by determining a specific portion of the computer network that is unstable during the given time period.

14. The tangible, non-transitory, computer-readable medium as in claim 12, wherein the method further comprises:

determining from the network topology information that a topology event has occurred within the computer network;

initiating a timer in response to the topology event within the computer network; and in a first instance, determining that the given time period of the unstable topology has ended based at least in part on an expiration of the timer without another topology event having occurred.

15. An apparatus, comprising:

one or more network interfaces to communicate with a computer network;

a processor coupled to the one or more network interfaces and configured to execute one or more processes; and a memory configured to store a process that is executable by the processor, the process, when executed, configured to:

receive measurement data from application agents of devices in the computer network;

receive network topology information related to stability of a topology associated with the devices in the computer network;

determine, based at least in part on the network topology information, a given time period during which the computer network exhibits an unstable topology;

filter the measurement data to remove a portion of the measurement data corresponding to the given time period of the unstable topology of the computer network, producing filtered measurement data that correspond to one or more stable topology periods of the computer network;

cause a measurement analysis process to perform network performance analysis on the filtered measurement data of the computer network during the one or more periods of stable topology; and analyze the network performance analysis to determine whether a deviation of the measurement data has occurred compared to previous measurement data collected during a previous stable topology period of the computer network.

16. The tangible, non-transitory, computer-readable medium as in claim 14, wherein the method further comprises:

in a second instance, resetting the timer in response to another topology event prior to the expiration of the timer to continue identifying the computer network as unstable.

17. The tangible, non-transitory, computer-readable medium as in claim 12, wherein the method further comprises:

monitoring the computer network to collect the network topology information; and based at least in part on the network topology information, detecting a topology event corresponding to the given time period.

18. The tangible, non-transitory, computer-readable medium as in claim 12, wherein performing network performance analysis on the computer network comprises:

processing measurement data to determine at least one issue with loss, latency, or liveness in the computer network.

19. The apparatus as in claim 15, wherein the process, when executed, is further configured to:

determine from the network topology information that a topology event has occurred within the computer network;

initiate a timer in response to the topology event within the computer network; and in a first instance, determine that the given time period of the unstable topology has ended based at least in part on an expiration of the timer without another topology event having occurred.

20. The apparatus as in claim 19, wherein the process, when executed, is further configured to:

in a second instance, reset the timer in response to another topology event prior to the expiration of the timer to continue identifying the computer network as unstable.

* * * * *